United States Patent [19]

Sheng et al.

[11] Patent Number: 4,706,256
[45] Date of Patent: Nov. 10, 1987

[54] FRITLESS ENDBELL ASSEMBLY

[75] Inventors: Shinan-Chur S. Sheng, Sunnyvale; Jeffrey Kaiser, Mountain View; Ralph R. Jacobs, Fremont; Alan B. Petersen, Palo Alto, all of Calif.

[73] Assignee: Spectra-Physics, Inc., San Jose, Calif.

[21] Appl. No.: 876,559

[22] Filed: Jun. 20, 1986

[51] Int. Cl.$^4$ .............................................. H01S 32/03
[52] U.S. Cl. ............................................ 372/61; 65/36; 65/37; 228/193; 372/100; 372/101; 372/103
[58] Field of Search .................... 372/98, 103, 61, 108, 372/109, 100, 101, 102, 105, 106; 228/193; 65/36, 37

[56] References Cited

U.S. PATENT DOCUMENTS 3,555,450 1/1971 Rockwell et al. ................. 372/103
4,637,684 1/1987 Tomita et al. ........................ 65/36
4,677,640 6/1987 Petersen et al. ..................... 372/99

Primary Examiner—James W. Davie
Assistant Examiner—Xhan Vo
Attorney, Agent, or Firm—Paul Davis

[57] ABSTRACT

An endbell assembly operatively associated with a laser body includes a metal endbell component sealed to a crystalline endbell component which terminates with a crystalline optical component. The crystalline endbell and crystalline optical component are hermetically sealed without using a frit. This is achieved by polishing and a modified optical contacting technique whereby the optical component and crystalline endbell component are polished to a flatness of about ½ wavelength of light, placed in a contacting position and then thermally cycled at a temperature of about 400°–500° C. for about 1 to 10 hours, forming a substantially uniform unitary body. This seal is mechanically strong and minimizes the introduction of contaminants into the endbell assembly. In one embodiment, the crystalline endbell component is metallized and braze-sealed to the metal endbell component. In another embodiment, the two endbell components are hermetically sealed by modified optical contact and thermal cycling.

23 Claims, 9 Drawing Figures

FRITLESS ENDBELL ASSEMBLY

FIELD OF THE INVENTION

This invention relates generally to endbell assemblies attached to a laser body, and more particularly, to a fritless endbell assembly associated with a laser.

BACKGROUND OF THE INVENTION

Some mechanism is necessary to contain the gas within a gas laser, while permitting free passage of the laser radiation. Endbell assemblies have been utilized to achieve this purpose. Endbell assemblies frequently are characterized by a hollow metal structure, physically attached to the laser body at one end and at the opposing end hermetically sealed with a window through which the laser light passes. The entire assembly is required to be vacuum-tight. These assemblies can be attached at opposing ends of the laser body. Although a window is the most common optical element with which to terminate a laser tube, other optical components including but not limited to prisms, birefringent filters, lenses, gratings, polarization devices, optical fibers, non-linear materials, mirrors and the like, can also be used.

The choice of window material is dictated first by its transparency to the desired laser light wavelengths, and then by practical considerations of ease of fabrication, cost, relative performance with use, etc. For ion lasers, a frequent material choice is crystalline quartz. In that case, the endbell consists of a crystalline quartz window portion and a metal endbell portion.

Endbell assemblies from a practical standpoint are not merely a metal portion which terminates in a window. For example, in an electrically excited laser, high voltages can exist on parts of the laser body other than the electrodes, in particular, metal portions of the endbells. These portions, if unprotected, may present a shock hazard to a laser operator. Because of this concern, an insulating, crystalline endbell component is interposed between the metal and window portions of the assembly, to separate and electrically isolate the window from the metal portion. This electrical isolation is highly desirable.

Other means exist for minimizing the chance of electrical contact by the user. In one, a metallic joint is formed between the metal portion of the endbell and the window itself. The structure of the assembly is such that the window portion is of larger diameter than the metal portion, and the latter is recessed from any possibility of exposure. Additionally, in another embodiment, an epoxy or non-conducting material could be applied to all metallic surfaces to eliminate metallic exposure and minimize the chance of an operator accident.

A variety of endbell designs and sealing techniques are possible. Essentially, a hard, brittle, anisotropic, high-expansion crystalline quartz window must be attached, by the endbell, to a metal tube on the laser body which frequently has dissimilar thermal expansion characteristics. This assembly must be clean, vacuum-tight, non-outgassing, durable, and bakable to about 400° C. It must also be capable of removal and re-attachment several times and possess at least one rotational degree of freedom. Vacuum seals compatible with these requirements are known as "hard seals".

Hard seals have been accomplished in basically three ways, with powdered glass frits, brazes or deformable metal gaskets. Metal gaskets require a clamp to compress the gasket which results in a large and cumbersome seal assembly.

Frequently the window is sealed to the quartz endbell component by means of frit glass. The practice of employing frit materials is somewhat undesirable in that the joint is mechanically weak, and the processes required can frequently introduce contaminants which may adhere to the window surface itself, degrading its optical performance.

Accordingly, it would be an advancement to provide an endbell assembly where the window, insulating crystalline endbell portion, and the metal endbell portion could be sealed together without employing frit glass.

SUMMARY OF THE INVENTION

Accordingly, it is an object of the present invention to provide a fritless endbell assembly associated with a laser body.

Another object of the present invention is to provide an endbell assembly which is sealed with an optical component such as a window during a process whereby assembly problems are minimized, and the process yield is relatively high.

Another object of the present invention is to provide an endbell assembly which includes a crystalline quartz window hermetically sealed to a crystalline quartz endbell component.

Still another object of the present invention is to provide a hermetically sealed endbell assembly whereby a crystalline quartz window and crystalline endbell component are processed to form a substantially continuous crystalline structure across their interface.

These and further objects of the present invention are achieved by providing a fritless endbell assembly which is operatively associated with a laser body. A crystalline endbell component and a crystalline optical component are optically contacted and thermally processed to form a hermetic seal. This seal is substantially a continuation of crystalline structure between the optical component and the crystalline endbell component. The crystalline endbell component is hermetically sealed to a metal endbell component which in turn is attached to the laser body.

In yet another embodiment of the present invention, there is disclosed a method for hermetically sealing a crystalline optical component surface to a crystalline endbell component surface. The crystalline endbell component is part of an endbell assembly which is associated with a laser body. Both surfaces are polished to a desired flatness and contaminants are substantially removed from each of the surfaces which are then contacted. This is followed by heating at sufficient temperature and duration to form a substantially continuous crystalline structure between the two surfaces.

Advantageously, the present invention provides an endbell assembly of a laser which does not employ a frit to seal the optical component such as a window. The endbell assembly is comprised of metal endbell and crystalline endbell components. These two components are joined through metallizing and brazing, and the crystalline endbell component is hermetically sealed to the crystalline optical component by modified optical contact. Utilization of the modified optical contact method eliminates the need for a frit to seal the optical component to the crystalline endbell component which previously has proven to be cumbersome, low-yielding, problematic, and has traditionally produced a mechanically weak seal. Additionally, utilization of a frit process can promote the introduction of contaminants into the interior of the endbell assembly which may become deposited on the interior surface of the optical component, degrading its optical properties.

In another embodiment of the present invention, a fritless endbell is achieved by metallizing the optical component and directly brazing it onto the metal endbell component.

Elimination of the frit, through the use of the newly discovered modified optical contacting method or brazing to a metallized surface, provides a substantially improved endbell assembly.

DETAILED DESCRIPTION OF THE DRAWINGS

DESCRIPTION OF THE PREFERRED EMBODIMENTS OF THE INVENTION

The present invention is a fritless endbell assembly operatively associated with a laser body. It generally includes a crystalline endbell component and a crystalline optical component which is optically contacted and thermally processed and thereby hermetically sealed to the crystalline endbell component. This substantially forms a continuation of crystalline structure between the optical component and the crystalline endbell assembly. A metal endbell component is attached to the laser body and the crystalline endbell assembly. The optical component can be one or more of the following: prism, birefringent filter, lens, grating, polarization device, optical filter, non-linear material, mirror, window, and the like. For ease of description throughout the remainder of this disclosure, the optical component shall be described as a window. However, it will be appreciated that the present invention is not limited to windows and that any of the previously mentioned optical components are suitable. Additionally, throughout the remainder of this disclosure, the crystalline material shall be referred to as quartz. However, other crystalline materials are also suitable.

Figure 1A:
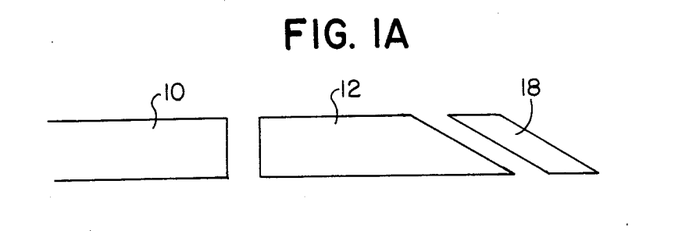
FIG. 1A schematically illustrates the relationship of an endbell assembly to a laser body.

As illustrated in FIG. 1, the end of a laser discharge tube 10 is illustrated. An exemplary laser discharge tube is a gas ion laser. However, the present invention is not limited to gas ion lasers but can also be utilized with molecular gas lasers, excimer lasers, and metal vapor lasers. It is particularly suitable for noble gas ion lasers. Attached to tube 10 is an endbell assembly 12 which terminates with a vaccum-tight, hermetically sealed window or other optical element 18, preferably at Brewster angle.

Figure 1B:
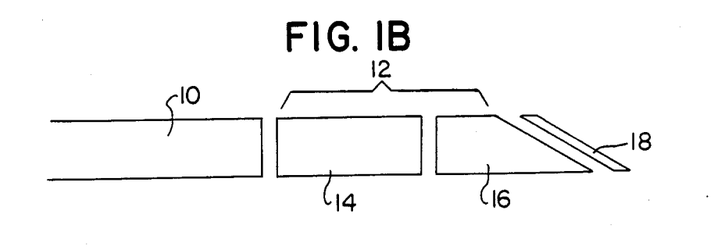
FIG. 1B schematically illustrates the endbell assembly of the present invention, comprising crystalline and metallic endbell components.

In FIG. 1B, endbell assembly 12 is illustrated as comprising a metal endbell component 14 and a crystalline endbell component 16. Components 14 and 16 are hermetically sealed to each other by means of metallizing and brazing, as further defined herein. A crystalline quartz window 18 is hermetically sealed to crystalline quartz endbell assembly 16 by means of the modified optical contacting method, as disclosed herein.

Window 18 is cut obliquely and mounted with respect to crystalline quartz endbell assembly 16 at Brewster angle. Although endbell assembly 16 and window 18 are both described herein as made of crystalline quartz, it will be appreciated that other materials are suitable for purposes of the present invention. However, crystalline quartz is the preferred material.

Crystalline quartz is a desired material for laser Brewster windows based on its availability, optical transmission properties, and resistance to mechanical and ultraviolet radiation damage. The optical properties of crystalline quartz require the two windows on a plasma tube be very precisely aligned with respect to each other. Thus, it is desirable to separate the sealing and alignment steps during processing if feasible. A full discussion of crystalline quartz and its requirements as utilized in a laser window assembly is disclosed in U.S. application Ser. No. 779,538, entitled "Crystalline Quartz Laser Window Assembly", assigned to the same assignee as this application, and incorporated fully herein by this reference.

Figure 2:
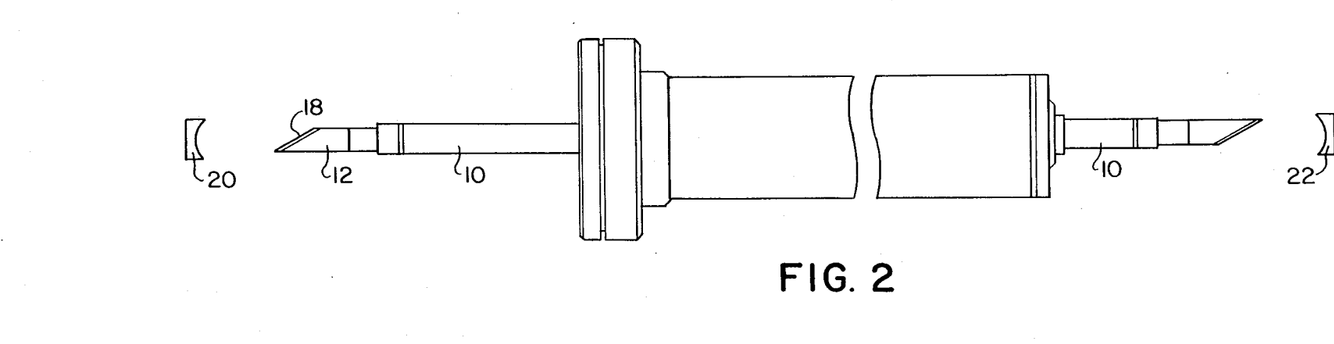
FIG. 2 schematically illustrates two endbell assemblies attached to opposing ends of a laser tube.

As illustrated in FIG. 2, both ends of laser tube 10 can terminate in an endbell assembly 12. Two mirrors 20 and 22 are disposed along the optical axis of laser tube 10 and define a resonator cavity. FIG. 2 shows only one embodiment of the present invention. For example, only one end may include an endbell assembly with the other end sealed in a like fashion.

Metallization

In one embodiment of the invention, the metal and crystalline quartz endbells are sealed through metallization of the quartz and then brazing the metallized quartz to the metallic surface of the metal endbell. Metallic, as used herein, is a generic term for either metal, a metal-plated metal such as nickel-plated steel, or another metallized quartz surface. The purpose of this technique is to metallize the quartz and be able to treat the metallized surface as simply another metal. Significantly, the seal must be vacuum-tight.

Figure 3A:
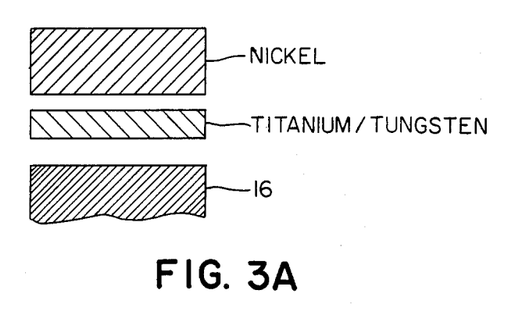
FIG. 3A illustrates schematically (not drawn to scale) one embodiment of metallizing the quartz endbell assembly.
Figure 5:
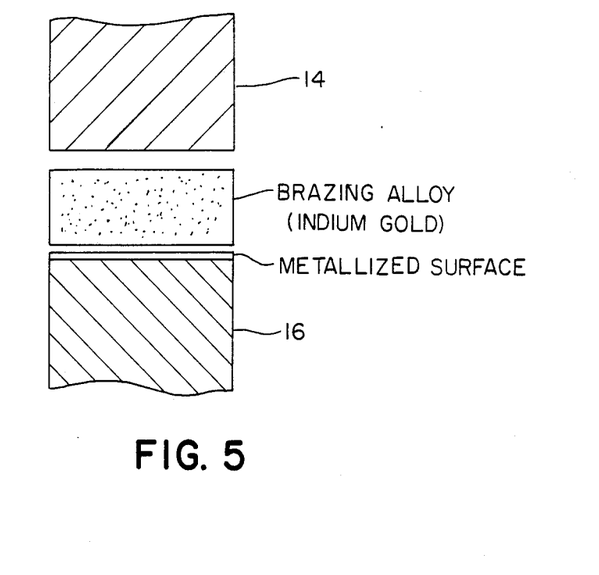
FIG. 5 illustrates schematically (not drawn to scale) the attachment of metallized quartz to a metal member by brazing.

FIG. 3A illustrates one embodiment of the metallization with the quartz endbell 16 followed by a titanium/tungsten layer and nickel. FIG. 5 illustrates that a brazing alloy such as indium-gold can be used to braze the quartz component 16 to the metal endbell component 14. An exemplary sequence would be the quartz endbell followed by approximately 1000 angstroms of a titanium/tungsten alloy comprising about 10% titanium and 90% tungsten, followed by about 5000 angstroms of nickel. This can be deposited, for example, by sputtering.

A magnetron sputtering technique can be employed where glow discharges are created, the target material is the titanium/tungsten and bombarded by ions in the glow discharge, liberating the metal and essentially producing a cloud which is then deposited on the quartz. The quartz surface can be prepared beforehand. First, it should be cleaned because a material exposed to air frequently results in some environmental contamination. The glow discharge method of deposition is convenient in that it reverses basically and removes just a small amount of material from the substrate. This essentially removes the contaminating environmental material so that the titanium/tungsten is deposited on a clean quartz surface. Other techniques of depositing the titanium/tungsten include but are not limited to electron beam evaporation, and the like. The actual parameters of time, conditions of sputtering, and the like are adjusted depending upon the desired result. However, conventional rates at which these materials are deposited are well known to those skilled in the art.

The nickel layer is deposited in the same way as the titanium/tungsten. Most of the sputtering equipment used has two or three cathodes that are employed to load different materials and deposit the various coatings without having to expose the surface being coated to the atmosphere. This ensures a clean surface with minimal contamination between layers.

The depositions described thus far are performed in a low pressure gas, typically argon or other inert gas. Argon is useful because of its low cost. It is easily ionized by the magnetron and therefore can be used to very conveniently remove material from the cathode target. Exemplary pressure conditions include but are not limited to less than about 100 torr or a tenth of an atmosphere. In one embodiment, the amount of nickel deposited is about 5000 to 6000 angstroms in thickness.

The thickness of the nickel layer can vary and be less than about 5000 angstroms. Essentially the determining factor is that since indium-gold will form an alloy with nickel, there must be sufficient nickel so all of it is not drawn into the alloy, weakening its adherence to the titanium/tungsten. A minimum thickness of nickel is thus established. A maximum thickness of nickel is established because nickel and quartz have different thermal expansion characteristics. A nickel layer which is too thick can lead to undesirable stresses in the film. With only 5000 to 6000 angstroms and greater than a millimeter thick quartz, nickel will deform with the expansion of the quartz due to its fairly low yield strength. Such a thickness layer avoids the two problems mentioned above.

The material chosen for the metal endbell component 14 can be, for example, stainless steel, nickel-plated steel, another piece of metallized quartz, a conventionally metallized ceramic such as alumina metallized by a moly-manganese process (well known in the vacuum tube art) or it can be a sputter metallized alumina piece.

As shown in FIG. 5, the choice of brazing alloy in one embodiment is indium-gold (approximately 18% indium with the balance being gold). Choice of brazing alloy is determined by the temperature requirements of the eventual joint and by the characteristics of the materials. In one embodiment of the present invention, there is an upper limit of approximately 575° C., due to a phase transition in crystalline quartz at that temperature. Therefore, any braze utilized should occur at a temperature lower than that. Additionally, there is a lower limit, in that subsequent processing of the entire endbell 12 will be at about 400° C. To provide for some safety margin between these two limits, it is highly desirable to utilize a braze material with a bonding temperature above about 430° C. and below about 550° C. Almost any alloy that melts in that range and forms a braze is capable of forming a slight alloy with the metal endbell component 12. Indium-gold is suitable because it has a melting point of about 480° C. During brazing it is desirable to take the furnace temperature to about 10 to 20 degrees higher than the brazing alloy's melting temperature.

As the lower limit for the brazing operation decreases, for example, in one instance about 300° rather than 400°, other alloys or even solders are possible, including but not limited to tin/silver. Germanium-gold is another alloy which has a lower melting temperature and is therefore suitable for purposes of the present invention.

Each layer of metallization serves a function. Titanium/tungsten provides a bonding layer to the quartz as well as a barrier layer to any braze alloy penetration. The nickel adheres to the titanium/tungsten and provides an easily brazed surface while being oxidation resistant. Nickel can also be a barrier layer; but since it alloys with the indium-gold, it is necessary to have another layer between the nickel and the quartz, less likely to alloy with the indium-gold.

Figure 3B:
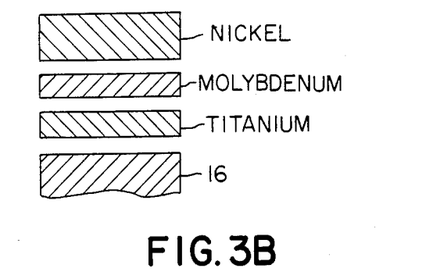
FIG. 3B illustrates schematically (not drawn to scale) a second embodiment of the metallized quartz.

In the embodiment illustrated in FIG. 3B, each layer essentially performs one function. A titanium layer forms a reactive bond with the quartz. Other materials which may be substituted for titanium and perform the same function include zirconium, vanadium, chromium, and the like. A more complete list is set forth in Table 1. Following the titanium, a barrier layer prevents any brazing alloy, from the top most metal layers, from diffusing through to the titanium. In this case molybdenum serves the purpose. On top of the barrier layer is a brazing layer, such as nickel, which provides a surface easily wetted by the brazing alloy.

Figure 3C:
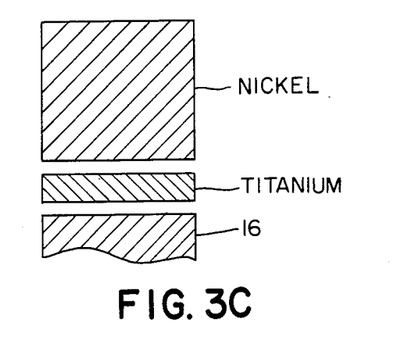
FIG. 3C illustrates a third embodiment (not drawn to scale) of the metallized quartz.

In a third embodiment of the invention, illustrated in FIG. 3C, an extra thick layer of nickel is substituted for the molybdenum. The nickel itself serves as a barrier layer. Thus, each of the different layers can provide different functions depending upon thickness, etc. In this third embodiment, the extra thickness of the nickel is on the order of a thousandth of an inch. In practice, the nickel is not entirely sputtered because, for example, it may require about 40 minutes to deposit 1000 to 5000 angstroms. Thus, depositing a thick layer of nickel on the order of a thousandth of an inch requires very long sputtering and deposition times. Application of the thick nickel layer could be achieved by sputtering a 1000 to 5000 angstrom thick layer followed by chemical bath plating of more nickel.

Table 1 sets forth more clearly the different materials which can be utilized for the different functions in metallization of the quartz. It is not possible to randomly select combinations of layers to achieve the desired metallization on the quartz substrate, as each layer must have good adherence to one another as well. In general, the best adherence occurs when adjacent layers form chemical bonds at their interface, but diffused bonds, and even some abrupt, non-reacted interfaces can be made satisfactorily by careful manufacture by those skilled in the art of thin-film deposition.

TABLE 1

| Bonding Layer Materials | Barrier Layer Materials | Brazing Surface Materials |
| --- | --- | --- |
| Titanium | Molybdenum | Nickel |
| Chromium | Tungsten | Copper |
| Zirconium | Platinum | Palladium |

TABLE 1-continued

| Bonding Layer Materials | Barrier Layer Materials | Brazing Surface Materials |
| --- | --- | --- |
| Niobium | Palladium | Platinum |
| Tantalum | Rhenium | Gold |
| Vanadium | | |
| Nichrome (nickel-chrome alloy) | Nichrome | Silver |
| Titanium-Tungsten alloys | Titanium-Tungsten alloy | |
| Other alloys of the above materials | Nickel | |

Crystalline quartz is known as a uniaxial crystal. This means, basically, that the crystal exhibits optical and mechanical properties along one crystalline axis (designated Z) which are different from those along the other, orthogonal axes (X and Y). In particular, the thermal expansion is uniform (isotropic) for all directions in the X, Y plane, but is very different for directions out of that plane. This is significant for the bonding of crystalline quartz to a dissimilar material with isotropic expansion characteristics, such as metal. In such a joint, even very small expansion anisotropies can lead to large stresses which will cause joint failure. In one embodiment of the invention, the quartz-metal brazed joint is arranged such that it is in the X-Y plane of the quartz. Thus, the expansion of both the metal and quartz are independent of direction within the joint. Although there remains a slight mismatch between the expansion of the quartz and the metal, this mismatch is independent of direction and can be accomodated as discussed below.

Figure 4:
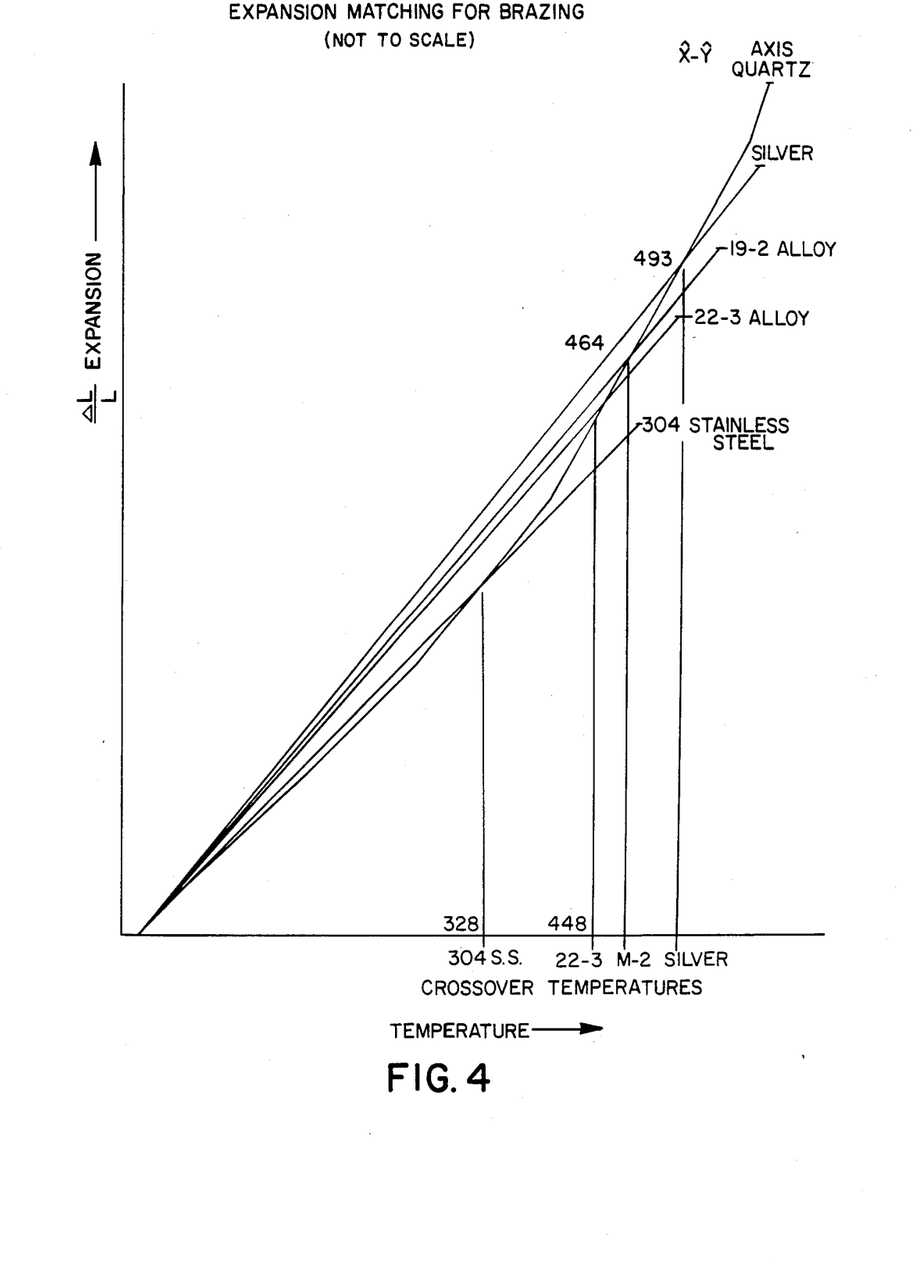
FIG. 4 is a graphic depiction of the expansion matching for brazing, plotting expansion versus temperature for 304 stainless steel, 22-3 alloy, 19-2 alloy, silver and quartz.

In FIG. 4 the total expansion of crystalline quartz in the X-Y plane is compared with that of several metals (silver, 19-2 steel alloy, 22-3 steel alloy, and 304 stainless steel). This expansion is referenced to room temperature. Silver has the highest expansion, followed, in decreasing order, by 19-2, 22-3 and 304. At lower temperatures, all of these materials have a higher expansion rate than crystalline quartz. However, crystalline quartz exhibits highly nonlinear expansion which increases faster than the other material as the temperature increases. Thus, the total quartz expansion eventually equals and exceeds that of the other materials. With reference to silver, it is noted that it has the highest temperature of "crossover" with respect to the quartz. This crossover temperature is about 493° C. 19-2 alloy has a crossover temperature of about 464° C., 22-3 alloy has a crossover of about 448° C., and 304 has a crossover of about 328° C.

The curves of FIG. 4 are utilized when making a brazed joint to the quartz endbell. The first step in choosing the apropriate brazing alloy was discussed earlier, based on the material considerations, 575° C. maximum for quartz, and the process considerations, 400° C. minimum for subsequent laser processing. These limits suggest indium-gold alloy. As the brazing alloy "freezes" at its solidus temperature, any thermal expansion mismatch between the quartz and the metal at the "freezing point" will result in a joint under stress as the joint comes back to room temperature. Such joint stress can result in weakened joints, and fracturing of the weakest joint material. The purpose of the expansion curves of FIG. 4 is to select mating materials that have nearly identical total expansion values at the braze alloy freezing temperature. For indium-gold alloy, the solidus temperature is 480° C. The metal with the closest expansion match to quartz at that temperature is silver. Economic and durability considerations are also be taken into account, so the choice of 19-2 steel, with a crossover temperature of 464° C., and then 22-3 steel crossing quartz at 448° C. are considered first and second alternates to silver.

With the selection of brazing alloy and metal to join to quartz, subsequent considerations are addressed, especially the compatibility of the metallic layers on the quartz, the brazing alloy, and the joint metal. For instance, the brazing alloy must wet and adhere to the metallic surfaces. Indium-gold does not wet 19-2 steel alloy, so the steel must be plated with nickel, a metal that is wet by indium-gold. The metallization must be compatible with the alloy as well, for it also must be wet, and in addition can not be completely dissolved into the alloy. For this reason, a top-most metallic coating of gold is not suitable for indium-gold alloy, but nickel is excellent.

For instance, a different brazing alloy (subject to different temperature constraints) can require a different metal with which to join to quartz, and require the use of a different sequence of metallization on the quartz. The metal endbell, quartz metallization and brazing alloy are not independent and are selected together as a complete system.

It will be appreciated that the present invention is not limited to quartz metallization alone, but sets forth a method employed in developing the metallization and brazing considerations for any insulating material to be bonded to a metal. This can include the intermediary insulator of the quartz component of the endbell assembly, or it can be the optical element used to seal the end of the laser itself including but not limited to a window, lens, grating, prism, filter, non-linear crystal and the like.

MODIFIED OPTICAL CONTACTING

Window (or other optical component) 18 is sealed onto the crystalline quartz endbell component 16 using non-conventional techniques, as defined by the present invention. Essentially the modified optical contact method of the present invention employs thermal cycling of an optical component after the crystalline components have been optically contacted. The temperatures achieved during the thermal processing are below the melting point of the crystalline components, and in one embodiment, the temperature is about 100° C. below the melting point.

Conventional techniques of achieving this have utilized fritting processes employing a thin layer of glass powder (frit) between the window 18 and the quartz endbell. This glass powder melts at an elevated temperature, bonds to both adjacent surfaces and solidifies as it is cooled, acting as a sort of "glue" at room temperature.

Optical contact has also been applied as a method of joining the aforementioned two pieces. However, optical contact alone does not form a very strong mechanical bond. Contacted pieces tend to fall apart easily, either by an external mechanical force of by subjecting the entire assembly to a very slight thermal gradient.

In one aspect of the present invention, a frit band is applied to the exterior of the joint at the contact boundary. This adds mechanical strength to the optical contacted window/endbell assembly, where the hermetic seal is provided by optical contact.

Another embodiment of the present invention provides for the joining and creation of a hermetic seal between crystalline quartz endbell assembly 16 and optical window or other optical component 18 by optical contact followed by a high temperature thermal cycle.

Generically, the two pieces are polished, or in some manner brought to a substantially matching flatness and cleaned to minimize introduction of contaminants. The mechanically strong hermetic seal of this modified optical contact is achieved by optical contact followed by a high temperature baking cycle of the two crystalline quartz pieces.

By way of example, after endbell component 16 and window 18 have been placed in contact, they are thermally cycled, in one embodiment, at about 500° C. for about 1 hour. It will be appreciated that the present invention is not so limited to the exact temperature parameter specified above. A wide range of thermal cycling parameters can be employed and includes but is not limited to heating at 400° C. for about 10 hours or 500° C. for about 1 hour, as well as temperature at time frames in between the two extremes. A temperature range of about 350° to 550° C. is suitable. A range of about 400° to 500° C. is preferred, and most preferably a temperature of about 500° C. applied for about one hour is preferred. The two crystalline pieces (optical component such as a window and the endbell component) are physically contacted after polishing to sufficiently squeeze out air or any other entrapped gas which may be disposed between the two components. The thermal process can take place in air, a non-corrosive environment such as an inert gas, or in vacuum ($10^{-3}$ torr or less is suitable).

Once the two crystalline quartz pieces have gone through this thermal regrowth cycle, it is very difficult to separate the two. With respect to thermal shocking, they have survived up to about 30° C. per minute cooling or heating rate. The bond formed between the crystalline endbell component and the optical component is mechanically strong. It is a thermally shock resistant mechanical bond having strength comparable to the optical component (window) itself.

Further, the present invention is also applicable to the use of a thermally treated optical contact joint between amorphous materials (including but not limited to glasses, semi-amorphous materials, and the like). In one embodiment a laser mirror is sealed to an end of a laser tube by the modified optical contacting method disclosed herein.

The following procedure discloses one embodiment of the present invention employing optical contact with thermal recycling, modified optical contact.

Initially both surfaces to be joined are polished preferably to better than about ½ of a wavelength of light of less than about 3,000 angstroms and more preferably of about 2,500 angstroms. The polishing can occur through any number of conventional means including but not limited to slow machine pitch polishing. The ½ wave surface flatness is not a strict requirement. Polishing is achieved through conventional means and may be in the form of a 60/40 grade in terms of nick and dig. Once this is achieved, the parts are immersed into a soap water solution during which an ultrasonic shaker cleans the surfaces thoroughly for about 30 minutes to remove contaminating particles. They are then rinsed in distilled water and acetone, and blow-dried with dry nitrogen.

For further cleaning, the window (optical component) is held securely and cleaned with a lint-free paper wetted with acetone, and wiped to minimize introduction of contaminating particles. The article is viewed frequently under a microscope to ascertain if visible particles are on the surface. This is followed by blowing it again with dry nitrogen, and then the two pieces are immediately pressed together. The surfaces are then pressed to force the two pieces into close contact and squeeze out air or other entrapped gases.

Following the actual contacting of the pieces, the thermal cycling begins. As previously mentioned, the thermal cycling preferably occurs at a temperature of between about 400°-500° C. for a time period from about 1-10 hours. The result is the formation of a bond between the two components. If the crystalline orientation of the two parts is identical, the crystalline structure between the two extends and to an appreciable extent a unitary quartz piece is produced.

In yet another embodiment of the present invention, it is possible to utilize the modified optical contact to join the metal and crystalline endbell components 14 and 16 together. The same steps of polishing surfaces, removal of contaminants, contacting and thermally cycling, as recited above, are employed.

In one embodiment, a crystalline quartz endbell assembly 16 is produced as follows. A hole is bored through the crystalline quartz piece. It is then cut into the appropriate shape, i.e., one end cut obliquely at Brewster angle. Both sides are then ground and one end polished to about ½ wave, followed by ultrasonic cleaning.

ATTACHMENT OF ENDBELL ASSEMBLY TO LASER BODY

Once endbell assembly 12 is complete, it is brazed to laser tube 10 using, for example, a low temperature indium-gold alloy. The alloy is low temperature which is desirable since there is less of a thermal shock potential to the endbell assembly. In one embodiment, the indium-gold eutectic melts at about 480° C.

Other alloys can be utilized. The higher the braze temperature, typically the better the result is. Exemplary high temperature alloys which can be utilized include but are not limited to a copper-silver eutectic (known as Cusil) which melts at about 780° C., indium-copper-silver combinations known as Incusil, which have melting points around 680°-705° C.

Figure 6:
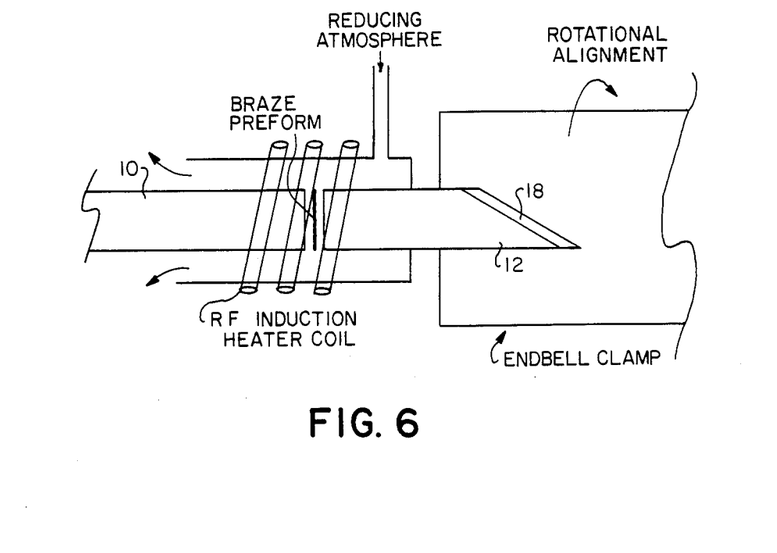
FIG. 6 schematically illustrates the attachment of the endbell assembly to the laser tube.

The completed endbell assembly 12 is clamped in a fixture with a braze alloy washer interposed between endbell assembly 12 and the body of laser tube 10 (as shown in FIG. 6). The two are pushed together in an adjacent contacting relationship while maintaining optical alignment. Adjustments are built into the fixtures so that endbell assembly 12 can be rotated to achieve the required precise optical alignment. Surrounding the joint region between endbell assembly 12 and laser body 10 is a shroud through which hydrogen flows. This substantially purges all of the oxygen and maintains a chemically reducing environment which is necessary for successful brazes.

There are no fluxes involved in this sealing which might introduce contamination into the laser tube. It involves melting an alloy which then flows and bonds to the metal parts to be connected. The shroud is quartz or a glass material and is non electrically conductive. An inductive heating coil is disposed outside and over the shroud, applying the actual heat necessary for brazing. The heating is localized in order to achieve the desired temperature at the braze joint without unnecessarily heating other temperature sensitive components nearby. If necessary, endbell assembly 12 is rotated slightly while the braze material is molten to aid in wetting the metal parts and confirm proper optical alignment. After the heater is turned off and the assembly allowed to cool, a hard seal is produced.

While we have illustrated and described the preferred embodiments of our invention, it is to be understood these are capable of variation and modification, and we therefore do not wish to be limited to the precise details set forth, but desire to avail ourselves of such changes and alterations as fall within the purview of the following claims.

We claim:

1. A fritless endbell assembly operatively associated with a laser body, comprising:
   a crystalline endbell component;
   a crystalline optical component optically contacted, thermally cycled and hermetically sealed to said crystalline endbell component, forming substantially a unitary continuous crystalline structure between said optical component and said crystalline endbell assembly; and
   a metal endbell component attached to said laser body and said crystalline endbell component.

2. The fritless endbell assembly of claim 1, wherein said optical component is a window.

3. The fritless endbell assembly of claim 2, wherein said endbell component and window are made of crystalline quartz.

4. The fritless endbell assembly of claim 2, wherein a mechanically strong bond is formed between said window and said crystalline endbell component.

5. The fritless endbell assembly of claim 4, wherein said bond formed between said window and said crystalline endbell component is a thermally shock resistant mechanical bond having substantially the same strength as the window material.

6. The fritless endbell assembly of claim 2, wherein a thermal regrowth cycle forms a substantially unitary structure between said window and crystalline endbell component.

7. The fritless endbell assembly of claim 2, wherein said window and crystalline endbell component each have a contacting surface which is polished to about ½ of a wavelength of light.

8. The fritless endbell assembly of claim 7, wherein each contacting surface is polished to about less than 3,000 angstroms.

9. The fritless endbell assembly of claim 7, wherein each contacting surface is polished to about 2,500 angstroms.

10. The fritless endbell assembly of claim 7, wherein each of said surfaces is contacted and then thermally regrown at a predetermined temperature and length of time to produce a substantially unitary piece.

11. The fritless endbell assembly of claim 7, wherein said window and crystalline endbell component are thermally regrown at a temperature of about 400°–500° C. for about 1 to 10 hours.

12. The fritless endbell assembly of claim 7, wherein said window and crystalline endbell component are thermally regrown at a temperature of about 500° C. for about one hour at a vacuum of less than about $10^{-3}$ torr.

13. The fritless endbell assembly of claim 1, wherein said laser body is a noble gas ion laser plasma tube.

14. The fritless endbell assembly of claim 1, wherein said laser body is a molecular gas laser.

15. The fritless endbell assembly of claim 1, wherein said laser body is an excimer laser.

16. The fritless endbell assembly of claim 1, wherein said laser body is a metal vapor laser.

17. The fritless endbell assembly of claim 1, wherein said laser body has two opposing ends each terminating with a fritless endbell assembly.

18. The fritless endbell assembly of claim 1, wherein said crystalline endbell component and metal endbell component are sealed by a metallization process.

19. The fritless endbell assembly of claim 1, wherein said endbell components are sealed with a braze comprising a layer of titanium-tungsten deposited on said crystalline endbell component, a layer of nickel disposed on said titanium-tungsten layer and an indium-gold brazing alloy joining the nickel to the metal endbell component.

20. The fritless endbell assembly of claim 1, wherein said endbell components are optically contacted to form a hermetic seal, said sealed structure providing sufficient mechanical strength to withstand thermal stresses associated with operation of the associated laser.

21. The fritless endbell assembly of claim 20, wherein said associated laser is a gas ion laser.

22. The fritless endbell assembly of claim 2, wherein said window is sealed to said crystalline endbell component at substantially Brewster angle.

23. An endbell assembly operatively associated with a laser body, produced by the method comprising:
   polishing a surface of crystalline material of an optical component to a surface of a crystalline quartz endbell component of the endbell assembly;
   substantially removing contaminants from each of said surfaces;
   bringing each of said surfaces to a contacting pressing position to remove gas entrapped between said surfaces; and
   thermally processing said contacted surfaces sufficiently to form a substantially continuous crystalline structure between said surfaces.

* * * * *